Patented Mar. 9, 1937

2,073,022

UNITED STATES PATENT OFFICE 2,073,022

PROCESS FOR EFFECTING CARBAZOLE RING FORMATION OF COMPOUNDS OF THE ANTHRAQUINONE SERIES

Walter Mieg and Franz Wieners, Opladen, Germany, assignors to General Aniline Works, Inc., New York, N. Y., a corporation of Delaware No Drawing. Application July 26, 1935, Serial No. 33,418. In Germany August 16, 1934

4 Claims. (Cl. 260—46)

The present invention relates to an improved process for effecting carbazole ring formation of compounds of the anthraquinone series.

It is known that anthrimides are capable of undergoing carbazole ring formation by fusing the same with aluminium halides. In U. S. Patent 1,690,236 to Walter Mieg, who is one of the inventors of the present application, there is described a modification of the said process by causing the action of the aluminium halide upon the anthrimide to proceed in the presence of cyclic compounds containing a tertiary nitrogen atom, such as pyridine, quinoline, dimethyl-aniline.

We have now found that this reaction can likewise be performed in the presence of inorganic or organic acid halides, particularly such acid halides, as are capable of forming molecular compounds with the aluminium halides. In this respect we refer to what is stated in the textbook "Organische Molekuelverbindungen" by Pfeiffer, 2nd edition, pages 29, 106 and 408. As examples of acid halides of the character described there may be mentioned thionylchloride, sulfonic acid chlorides or carboxylic acid chlorides of the aliphatic or aromatic series, such as acetic acid chloride, benzoyl chloride, benzene sulfonic acid chloride and methyl-sulfonic acid chloride.

The anthrimides which serve as starting material for our new process may be defined as "secondary aromatic amines, wherein at least one of the aromatic residues is an acylaminoanthraquinone residue". The other residue may be an anthraquinone residue or another aromatic group such as a residue of the benzene, naphthalene, benzanthrone-, perylene-, pyrene-, pyranthrone residue and the like. The nuclei may contain various substituents; however, at least one ortho-position with respect to the imino group must be unsubstituted in both of the residues. Compounds of the type of trianthrimides i. e. such compounds as contain several imino groups may be employed as starting material without departing from the sense of our invention.

Working in the presence of acid chlorides of the character described effects that in most cases the reaction can be performed at much lower temperatures and that the danger of undesirable by-reactions can be avoided.

The following examples illustrate the invention, without, however, restricting it thereto, the parts being by weight:—

Example 1

15 parts of sublimated aluminium chloride are introduced while cooling into 25 parts of acetylchloride, whereupon 5 parts of 4.5'-dibenzoyldiamino-1.1'-dianthraquinonylamine are mixed in. The reaction is finished after a short time. The melt is then stirred into water with the addition of 1 part of sodium nitrite, filtered and the residue is mixed with dilute caustic soda solution while heating in order to remove the aluminium. The reddish-brown vat dyestuff thus obtained dissolves in sulfuric acid with a red coloration and is most probably the 4.5'-dibenzoylamino-1.1'-dianthrimide carbazole.

Example 2

When treating 5 parts of 4.5'-dibenzoyldiamino-1.1'-dianthraquinonylamine in a solution of 20 parts of sublimated aluminium chloride and 40 parts of thionylchloride at a temperature of 50–55° C. and working up as described in Example 1, a reddish brown vat dyestuff of the properties of the product of Example 1 is obtained.

The same dyestuff may be obtained by substituting the thionylchloride by a suitable amount of benzoylchloride.

Example 3

12 parts of a trianthrimide, obtainable by the condensation of 1 mol. 1.5-dichloroanthraquinone and 2 mols of 1-benzoylamino-4-aminoanthraquinone, are introduced into a mixture of 45 parts of benzoylchloride and 20 parts of sublimated aluminium chloride (if desired with the addition of sublimated iron chloride) at a temperature of 20° C. The temperature spontaneously rises by degrees to 32° C. The mixture is then stirred at room temperature until a test portion shows that the starting material has completely disappeared, which process takes about 5 hours. The melt is thereupon poured into water, to which a small amount of sodium nitrite has been added, and heated, until the benzoylchloride is saponified. The amount of the water used must be sufficient to keep the benzoic acid formed in solution in the heat. After filtering by suction while heating, the benzoic acid is obtained from the filtrate in the usual way. The residue is freed from the aluminium salt in a suitable manner (for example, by revatting or other methods) and isolated. It forms a reddish-brown substance being free of halogen, which dissolve in concentrated sulfuric acid with a violet-tinged red coloration. When pouring the solution in water a reddish-brown precipitate of the dyestuff is obtained. By a treatment with oxidizing agents in an acid or alkaline suspension, for example, in an alkaline hypochlorite solution, the purity and the clarity of the product are greatly improved. In this case as well as in some other cases it is of advantage to dissolve the product obtained after removing the benzoic acid and which still contains aluminium, in concentrated sulfuric acid and to precipitate the reaction product by pouring it into water.

The time of reaction may also be shortened by slightly heating the reaction mixture, for example, by heating to 70° C. the starting material has completely disappeared after about a quarter of an hour.

The dyestuff is most probably the carbazole of the anthrimide employed. It dyes cotton from a brownish-red vat very fast reddish-brown shades.

*Example 4*

To a solution of 20 parts of aluminium chloride in 45 parts of thionylchloride 5 parts of the same dibenzoyl-amino-trianthrimide as described in Example 3, are added at a temperature of about 60° C. The reaction mixture is heated for 1 hour to 75° C. and then worked up. A reddish brown vat dyestuff is thus obtained, which possesses similar properties as the dyestuff of Example 3.

*Example 5*

50 parts of methane sulfochloride are mixed with 30 parts of sublimated aluminium chloride, which combine with each other under a slight self-heating. In the melt thus obtained 10 parts of 4.8'-dibenzoyldiamino-1.1' - dianthraquinonylamine are dissolved at a temperature of 60° C. The melt assumes an orange-red coloration after a short time. Stirring is continued at about 60° C. for some time and thereupon it is worked up in the usual manner. A brown vat dyestuff is thus obtained, which dissolves in sulfuric acid with a red coloration and dyes cotton from a reddish-brown vat very fast shades.

*Example 6*

A mixture of 24 parts of benzoylchloride, 15 parts of aluminium chloride and 5 parts of 1-benzoylamido - 4.2' - naphthylaminoanthraquinone are heated while stirring to a temperature of 40–50° C. for about 10 minutes. The melt is then poured into water, which contains 4 parts of sodium nitrite in a dissolved state, and the whole is heated in a water bath until the benzoylchloride is completely decomposed. The reaction product separated can be recrystallized from pyridine or nitrobenzene for purification. It dissolves in concentrated sulfuric acid with a dark green coloration and is precipitated therefrom in water in brownish-red flakes. The dyestuff is most probably the 1.2-phthaloyl-3-benzoylamino-5.6-benzocarbazole. It dyes cotton from a vat strong Bordeaux-red shades.

*Example 7*

A mixture of 30 parts of benzolsulfochloride, 20 parts of sublimated aluminium chloride and 5 parts of 4.5'-dibenzoylamino-1.1-dianthraquinonylamine is heated to 60° C. for about half an hour. Water, containing some sodium nitrite is then added in order to decompose the mixture, preferably with a steam treatment, and, after removing the aluminium from the residue a dyestuff is obtained which dissolves in concentrated sulfuric acid with a red coloration. The dyestuff has similar properties as that described in Example 1.

*Example 8*

20 parts of sublimated aluminium chloride are dissolved while cooling in 30 parts of acetylchloride. The solution of the double compound thus obtained is then mixed with 4 parts of 4.4'-dibenzoylamino-1.1'-dianthrimide. The reaction performs at room temperature in a very short time, which can be observed by a change to red of the solution. After the starting material has completely disappeared, working up is performed as described above. An olive vat dyestuff is thus obtained, which dissolves in concentrated sulfuric acid with a red coloration.

*Example 9*

30 parts of benzoylchloride and 20 parts of sublimated aluminium chloride are mixed with each other and in the solution of the double compound thus obtained 5 parts of a trianthrimide obtained from 1 mol. of 2.6-dichloroanthraquinone and 2 mols of 1-amino-5-benzoylaminoanthraquinone, are introduced at a temperature of 60° C. Heating to 60–70° C. is continued for about half an hour and the decomposition is effected by the addition of water containing sodium nitrite. The benzoic acid formed by saponification with water, may be separated from the reaction product by steam distillation. The reaction product itself is freed from aluminium in a suitable manner. It forms a yellowish-brown powder, dyeing cotton from a brownish-red vat brownish-yellow shades.

*Example 10*

14 parts of aluminium chloride are dissolved in 32 parts of thionylchloride and thereupon 4 parts of a polyanthrimide obtained by condensing in the usual manner 1 mol. of 5.5'-diamino-1.1'-dianthraquinonylamine with 2 mols of 1-benzoylamino-5-chloroanthraquinone are added thereto at about 50° C. The temperature is raised to 75° C. and maintained at this degree for about 30–40 minutes. For isolating the dyestuff the melt is poured into water, sucked off and the aluminium containing substance thus obtained is decomposed by a treatment with alkali. The dyestuff dyes strong yellowish-brown shades.

*Example 11*

Into a mixture of 80 parts of benzoylchloride and 50 parts of aluminium chloride (which mixture contains a solution of the double compounds in benzoylchloride) 10 parts of 4.8'-dibenzoylamino-1.1'-dianthraquinonylamine are introduced at a temperature of 75° C. The reaction being finished, which may be seen from a worked-up test portion, the melt is poured into water containing some nitrite, and the benzoic acid is removed by steam. The residue is freed from the aluminium salt in the usual manner. The dyestuff thus obtained forms a reddish-brown powder, which dyes cotton from a vat the same shades. It is identical with the dyestuff obtained according to Example 5.

We claim:

1. The process which comprises causing aluminium chloride in the presence of such acid chlorides as are capable of forming molecular compounds with aluminium chloride to react upon secondary aromatic amines wherein at least one of the aromatic residues is an acylaminoanthraquinone residue and at least one orthoposition with respect to the imino group is unsubstituted in both of the residues.

2. The process as claimed in claim 1, wherein benzoylchloride is employed as acid halide.

3. The process as claimed in claim 1, wherein acetic acid chloride is employed as acid halide.

4. The process as claimed in claim 1, wherein thionylchloride is employed as acid halide.

WALTER MIEG,
FRANZ WIENERS.